United States Patent
Paul et al.

(10) Patent No.: US 12,052,149 B2
(45) Date of Patent: Jul. 30, 2024

(54) NETWORKS FOR PACKET MONITORING AND REPLAY

(71) Applicant: BGC PARTNERS, L.P., New York, NY (US)

(72) Inventors: Bijoy Paul, Jersey City, NJ (US); Ian Davies, London (GB)

(73) Assignee: BGC PARTNERS, L.P., New York, NY (US)

( * ) Notice: Subject to any disclaimer, the term of this patent is extended or adjusted under 35 U.S.C. 154(b) by 0 days.

(21) Appl. No.: 18/094,563

(22) Filed: Jan. 9, 2023

(65) Prior Publication Data

US 2023/0164040 A1    May 25, 2023

Related U.S. Application Data

(60) Continuation of application No. 16/538,088, filed on Aug. 12, 2019, now Pat. No. 11,552,865, which is a division of application No. 16/028,881, filed on Jul. 6, 2018, now Pat. No. 10,594,572.

(60) Provisional application No. 62/530,706, filed on Jul. 10, 2017.

(51) Int. Cl.
  *H04L 43/022* (2022.01)
  *H04L 43/106* (2022.01)
  *H04L 43/12* (2022.01)

(52) U.S. Cl.
  CPC .......... *H04L 43/022* (2013.01); *H04L 43/106* (2013.01); *H04L 43/12* (2013.01)

(58) Field of Classification Search
  None
  See application file for complete search history.

(56) References Cited

U.S. PATENT DOCUMENTS

| | | | |
|---|---|---|---|
| 7,505,192 B1 * | 3/2009 | Zhao | G02F 1/093 359/281 |
| 9,756,061 B1 * | 9/2017 | Roeh | H04L 63/1408 |
| 11,552,865 B2 * | 1/2023 | Paul | H04L 43/12 |
| 2003/0088667 A1 * | 5/2003 | Riedle | H04L 67/06 709/224 |
| 2003/0200311 A1 * | 10/2003 | Baum | H04L 45/54 709/224 |
| 2008/0222475 A1 * | 9/2008 | Nam | H04L 43/0829 714/747 |
| 2010/0034170 A1 * | 2/2010 | Hirano | H04L 47/10 370/331 |
| 2011/0211473 A1 | 9/2011 | Matityahu et al. | |
| 2012/0084605 A1 | 4/2012 | Shilon et al. | |
| 2012/0230202 A1 * | 9/2012 | Reed | H04L 63/0209 370/241 |
| 2012/0331553 A1 | 12/2012 | Aziz et al. | |
| 2016/0285575 A1 * | 9/2016 | Holmeide | H04L 43/00 |
| 2017/0163567 A1 * | 6/2017 | Roitshtein | H04L 49/9005 |
| 2018/0287900 A1 * | 10/2018 | Pang | H04L 43/026 |

(Continued)

FOREIGN PATENT DOCUMENTS

WO    2016097459    6/2016

*Primary Examiner* — Nguyen H Ngo

(57) ABSTRACT

Disclosed herein are a system, non-transitory computer readable medium, and method for monitoring and replaying packets. A network tap forwards packets from a first network to a second network. At least one node in the first network has the same IP address as a node in the second network. The packets are replayed in the second network.

15 Claims, 7 Drawing Sheets

(56) References Cited

U.S. PATENT DOCUMENTS

| | | | |
|---|---|---|---|
| 2018/0375876 A1* | 12/2018 | Blöcher | H04L 63/20 |
| 2019/0020599 A1* | 1/2019 | Sanchez Melendez | H04L 45/54 |
| 2019/0081720 A1* | 3/2019 | Barry | H04W 56/0015 |

\* cited by examiner

NETWORKS FOR PACKET MONITORING AND REPLAY

CROSS-REFERENCE TO RELATED APPLICATIONS

This application is a continuation of U.S. patent application Ser. No. 16/538,088 filed Aug. 12, 2019, which is divisional of U.S. patent application Ser. No. 16/028,881 filed Jul. 6, 2018 (now U.S. Pat. No. 10,594,572 issued Mar. 17, 2020), which claims the benefit of U.S. Provisional Application No. 62/530,706 filed Jul. 10, 2017, each of which are incorporated by reference herein in its entirety.

BACKGROUND

Computer networks heretofore may include a mesh of interconnected servers, hubs, routers, switches, and storage arrays carrying critical information. Such networks may be prone to infrastructure failures due to network hardware changes and network congestion.

DETAILED DESCRIPTION

Figure 1:
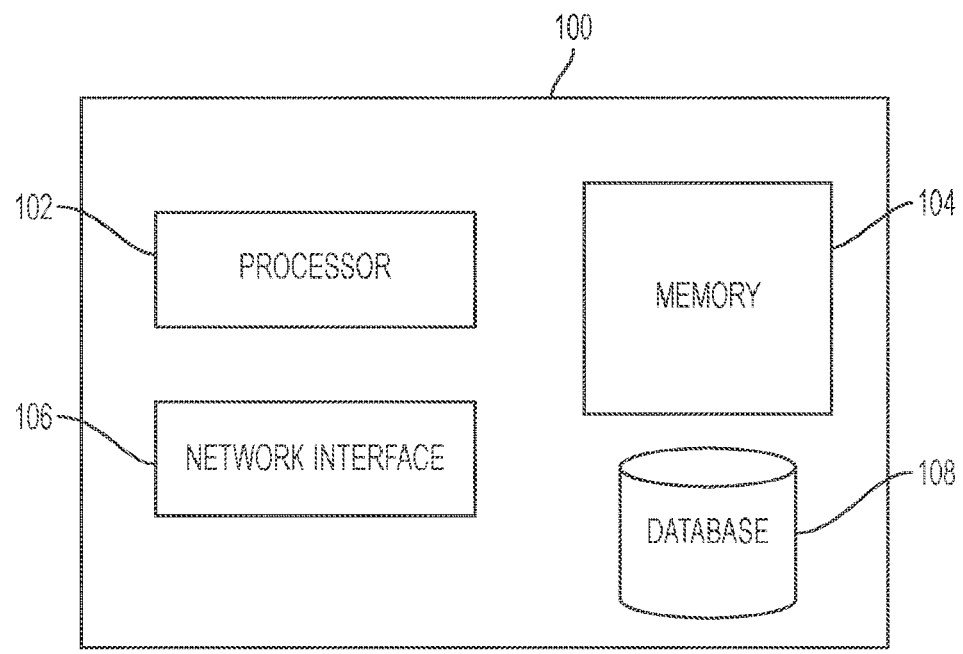
FIG. 1 is an illustrative computer apparatus in accordance with aspects of the disclosure.

As noted above, networks may be prone to failures. In some networks, the sequence in which data packets are transmitted may be critical. For example, in video streaming networks, packets must typically arrive at the playback device in the correct sequence so that the video shows correctly. In a trading system, the correct sequence of the packets may be important so that the correct state of the order is reflected on a trader's workstation. Furthermore, packets may be lost during transmission. In this instance, a network administrator may attempt to recover the lost packets. However, an administrator troubleshooting lost or out-of-sequence data packets may disrupt the performance of a live production network. The administrator may need to execute trouble shooting software that may slow down a live data network being used by customers. Such a disruption may result in customer dissatisfaction, which in turn may lead to a loss of revenue.

In view of the foregoing, disclosed herein are an apparatus, method, and non-transitory computer readable medium that monitors live production data packets and permits playback of these packets without disrupting a live production network. In one example, an apparatus may comprise a network interface and at least one processor to carry out the following operations: establish communication with a network terminal access point (TAP) of a first network, each node of the first network having an internet protocol (IP) address; establish communication with at least one node of a second network, each node in the second network corresponding to a node in the first network such that respective IP addresses of corresponding nodes are equal; receive a first packet and a second packet from the network TAP of the first network, each packet comprising a source IP address and a timestamp, the source IP address indicating a respective node in the first network from where each packet originates; and launch the first packet and the second packet from a respective node in the second network that corresponds to the source IP address of each packet in a sequence that is in accordance with the timestamp of each packet.

In yet another aspect, a network TAP apparatus may comprise a plurality of network interfaces and at least one processor. The at least one processor may receive, via a network interface, a first packet from a source device. The first packet may be bound for a destination device. The source device and the destination device may be nodes of a first network. The source device and the destination device may each be associated with a respective IP address. The at least one processor may also generate a duplicate packet that is a copy of the first packet. The network TAP may also forward, using another network interface, the duplicate packet to another destination device whose IP address is identical to that of the destination device in the first network. The other destination device may be a node in a second network different from the first network.

The aspects, features, and advantages of the present disclosure will be appreciated when considered with reference to the following description of examples and accompanying figures. The following description does not limit the application; rather, the scope of the disclosure is defined by the appended claims and equivalents.

FIG. 1 shows a schematic diagram of an illustrative computer apparatus 100 for executing some of the techniques disclosed herein. Computer apparatus 100 may comprise a device capable of processing instructions and transmitting data to and from other computers, including a laptop, a full-sized personal computer, a high-end server, or a network computer lacking local storage capability. Computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface 106 to communicate with other devices over a network. As will be noted further below, computer apparatus 100 may be used to store and replay packets, The computer apparatus 100 may also contain at least one processor 102, such as processors from Intel® Corporation. In another example, processor 102 may be an application specific integrated circuit ("ASIC"). Memory 104 may store instructions that processor 102 may retrieve and execute. In one example, memory 104 may be used by or in connection with an instruction execution system that permits processor 102 to fetch or obtain the logic from memory 104 and execute the instructions contained therein.

Memory 104 may be a non-transitory computer readable medium ("CRM"), which may comprise any one of many physical media such as, for example, electronic, magnetic, optical, electromagnetic, or semiconductor media. Some examples of suitable non-transitory computer readable medium include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. The non-transitory CRM may also include any combination of one or more of the foregoing and/or other devices as well.

As noted above, computer instructions stored in memory 104 may cause processor 102 to carry out one or more of the techniques disclosed herein. These instructions may comprise any set of instructions to be executed directly (such as machine code) or indirectly (such as scripts) by processor 102. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will also be discussed further below, computer apparatus 100 may store and sort data packets for replay in database 108. These packets may be retrieved later for replay. Database 108 is not limited to any particular data structure. The data stored in database 108 may be formatted in any computer-readable format. Database 108 may comprise computer registers, a relational database with multiple tables arranged with fields and records, XML documents, or flat files. The stored data may comprise any information sufficient to identify the relevant information, such as numbers, descriptive text, proprietary codes, references to data stored in other areas of the same memory or different memories (including other network locations) or information that is used by a function to calculate the relevant data.

While FIG. 1 only depicts one processor, one memory, and one database, it is understood that computer apparatus 100 may actually comprise additional processors, memories, and databases working in tandem that may or may not be stored within the same physical housing or location. To wit, although all the components of computer apparatus 100 are functionally illustrated as being within the same block, it will be understood that the components may or may not be stored within the same physical housing.

Figure 2:
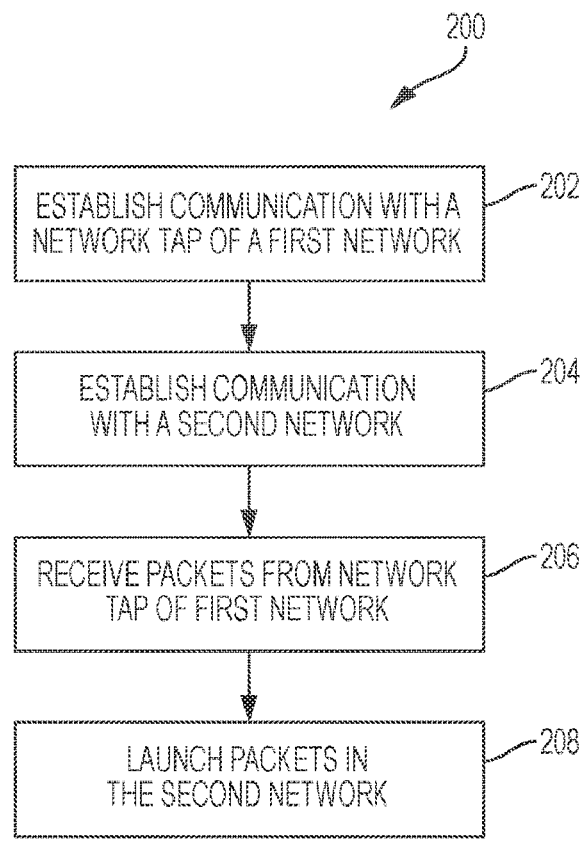
FIG. 2 is a flow diagram of an example method in accordance with aspects of the disclosure.
Figure 3:
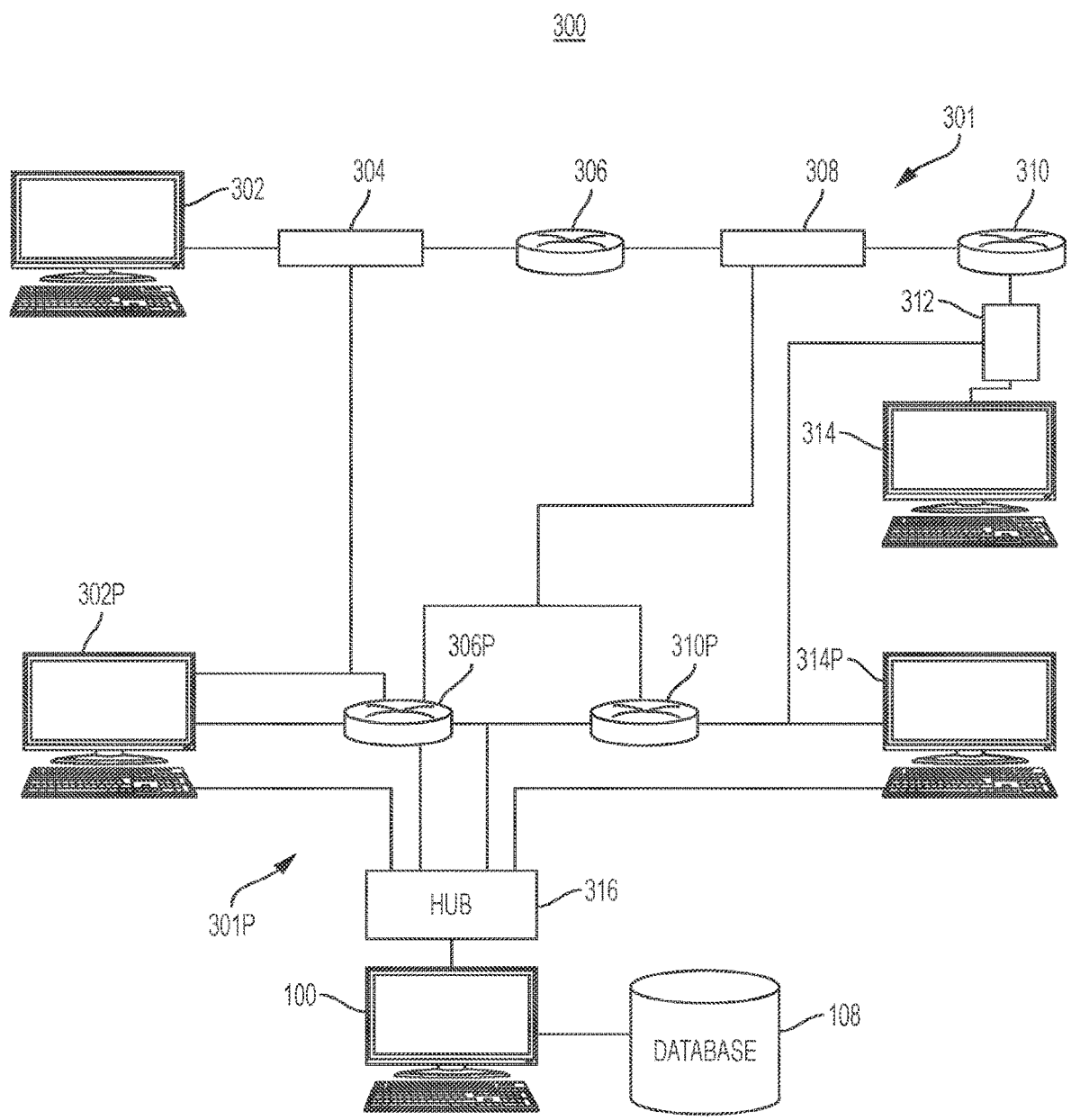
FIG. 3 is an example network topology in accordance with aspects of the present disclosure.
Figure 3A:
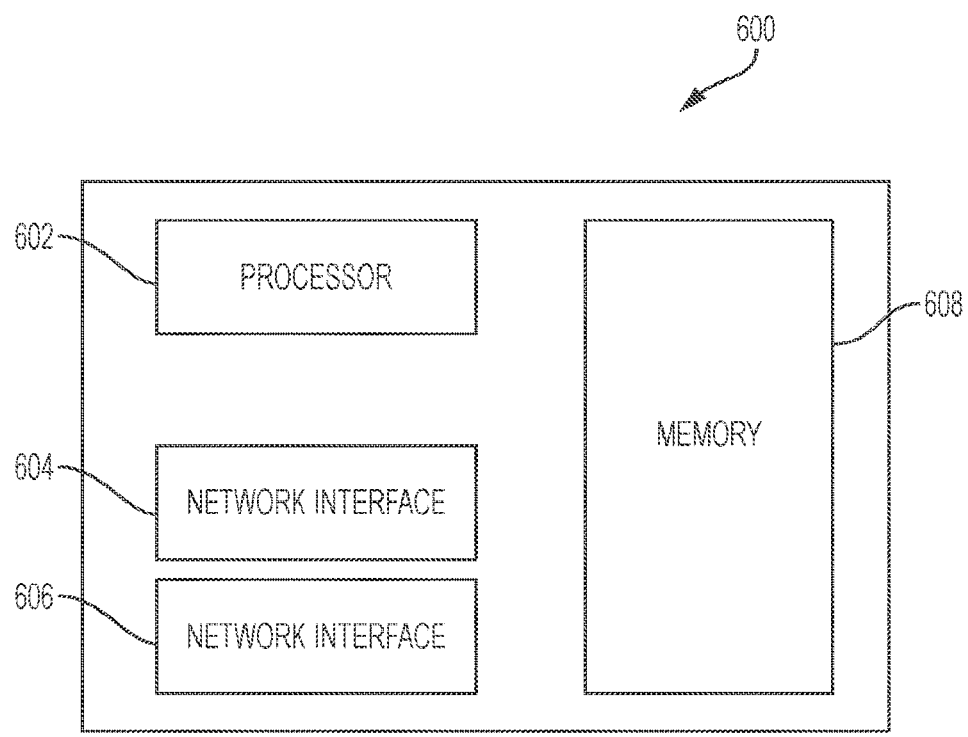
FIG. 3A is an example network tap in accordance with aspects of the present disclosure.
Figure 3B:
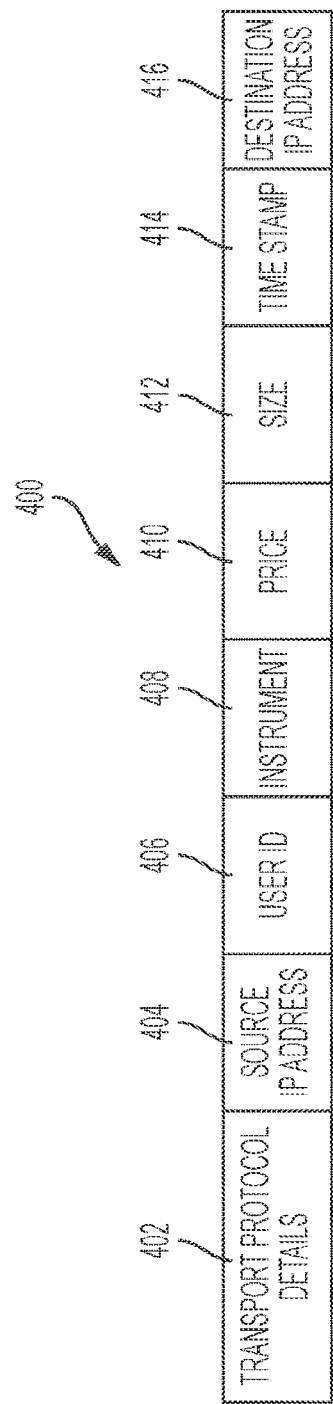
FIG. 3B is an example packet in accordance with aspects of the present disclosure.
Figure 3C:
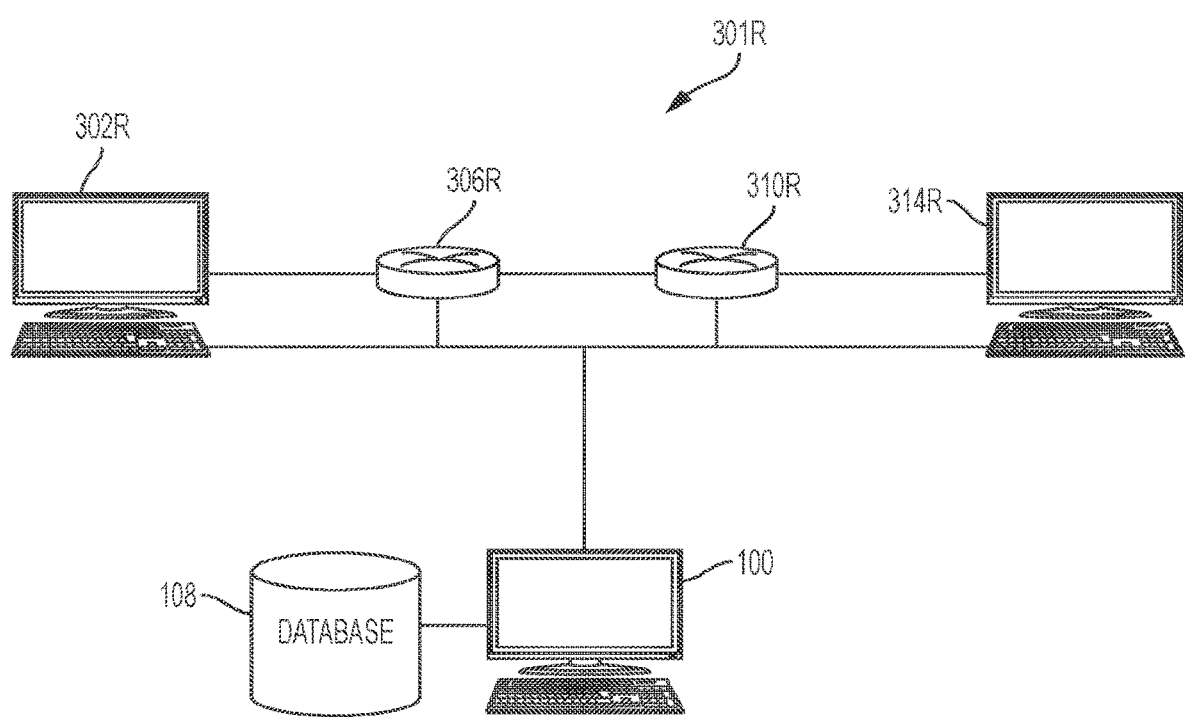
FIG. 3C is another example network in accordance with aspects of the present disclosure.

One working example of the system, method, and non-transitory computer readable medium is shown in FIGS. 2-3C. In particular, FIG. 2 illustrates a flow diagram of an example method 200 for monitoring and replaying packets. FIGS. 3-3C show a working example in accordance with the techniques disclosed herein. The actions shown in FIGS. 3-3C will be discussed below with regard to the flow diagram in FIG. 2.

Referring to FIG. 2, a processor (e.g., a processor 102 of computer apparatus 100) may establish communication with a network TAP of a first network, as shown in block 202. In block 204, a processor may also establish communication with at least one node of a second network. Referring now to FIG. 3, an example network topology in accordance with aspects of the disclosure is shown. FIG. 3 illustrates a network 301 and a network 301P. In the example of FIG. 3, network 301 may be a production environment that includes workstations 302 and 314; switches 306 and 310; and, network TAPS 304 and 308. Network 301P may be a packet monitoring environment that includes workstations 302P and 314P; switches 306P and 310P; hub 316; computer apparatus 100; and database 108. In the example of FIG. 3, at least one node in the second network 301P may correspond to a node in the first network 301 such that respective IP addresses of corresponding nodes are equal. For example, workstation 302 and 302P may have identical IP addresses.

Furthermore, switches 306 and 306P and switches 310 and 310P may also have identical IP addresses. The advantage of having these identical IP addresses will be explained further below.

The workstations 302, 314, 302P, and 314P may also have at least one processor, at least one memory, and at least one network interface like computer apparatus 100 shown in FIG. 1. Networks 301 and 301P may be local area networks ("LAN") or a wide area networks ("WAN"). A LAN may include, for example, an Ethernet 10/100 LAN or a gigabit Ethernet LAN. Networks 301 and 301P may be connected to a service provider via a cable network, a digital subscriber line (DSL) network, a T1 or T3 network, a microwave network, a WiMAX (IEEE 802.16) network, or the like. Furthermore, networks 301, 301P, and the intervening nodes therein may use various protocols including virtual private networks, local Ethernet networks, and private networks using communication protocols proprietary to one or more companies, cellular and wireless networks, HTTP, and various combinations of the foregoing. In one example, networks 301 and 301P may be wireless networks that conform to standards including Bluetooth®, IEEE 802.11a, IEEE 802.11b, IEEE 802.11g, IEEE 802.16, or the like. It is understood that the network topologies shown in FIG. 3 are merely illustrative and that many different topologies may be implemented. Furthermore, it is understood that a network topology may include many more workstations, hubs, switches, servers, and network TAPS and that the example of FIG. 3 shows a small number of nodes for ease of illustration only.

Network 301 is shown with a workstation 302 in communication with another workstation 314. In between workstation 302 and workstation 314, there are two network switches, switch 306 and switch 310, and three network TAPS 304, 308, and 312. As noted above, at least one device of network 301 may have a corresponding device in network 301P. These corresponding devices may have identical IP addresses. That is, if the IP address of switch 306 is 155.22.76, 222, the IP address of the corresponding switch 306P may be the same. By way of example, workstations 302 and 314 of network 301 correspond to workstations 302P and 314P of network 301P respectively. Switches 306 and 310 of network 301 correspond to switches 306P and 310P in network 301P respectively.

Each switch in the network shown in FIG. 3 may comprise a memory, and a processor. Further, each switch may include a number of data ports, such as uplink data ports and downlink data ports. One or more switches in the networks of FIG. 3 may also include data comprising flow tables. For example, each entry in a given flow table may include a key and an action. As a switch receives packets, header information in those packets may be matched against the keys of the flow table to determine a corresponding action such as a next hop. The entries in the flow table may be used directly or indirectly to forward packets. While each switch in FIG. 3 is depicted as hardware switches, a software based switch may be used in other examples. In this instance, the flow table may be accessed directly by a forwarding software module to alter the packet's header information and to forward the packet to an appropriate port. Alternatively, a processor of a switch may program hardware modules based on the flow table entries, and these hardware modules may forward packets based on each flow's match criteria, action, and priority. As noted above, network 301 may be a live or primary network where users are transferring real-time data between workstation 302 and workstation 314. In contrast, network 301P may be used for capturing the packets and/or replaying the packets.

Each network TAP 304, 308, and 312 of network 301 may comprise hardware that duplicates each packet flowing between a respective pair of network nodes (i.e., network TAP 304 mirrors bi-directional packets flowing between workstation 302 and switch 306, network TAP 308 mirrors bi-directional packets flowing between switch 306 and switch 310, and so on). The duplicated packet may be forwarded to the device in network 301P that corresponds to the destination device in network 301. By way of example, workstation 302 may transmit a packet destined for switch 306. In this instance, network TAP 304 may create a duplicate of the packet and forward that duplicate to the corresponding switch 306P in network 301P. By way of further example, if a packet is traveling from switch 306 to workstation 302, network TAP 304 may create a duplicate and forward that duplicate to workstation 302P. As such, each network TAP may forward duplicates to the corresponding destination node in network 301P depending on the direction of the packet.

As noted earlier, corresponding devices in networks 301 and 301P may have identical IP addresses. By using an identical IP address, the duplicate packet created by a network TAP would automatically route to the corresponding device in network 301P without needing additional logic in the network TAP to alter the destination address. For example, if a network TAP in the production environment forwarded all the duplicate packets to a monitoring device with a unique IP address, the destination IP address of each duplicate packet may need to be changed so that each packet routes accordingly. Changing the destination IP of each packet may be a burden on the production environment and may cause further delays.

The switches and workstations of network 301 and their counterparts in network 301P may all be time synchronized. By way of example, if network TAP 304 of FIG. 3 copies a packet and forwards the duplicate to switch 306P and the timestamp of the duplicate is not synchronized with the internal clock of switch 306P, switch 306P may reject the duplicate packet. Therefore, in one example, a timeserver (not shown) may be linked to the switches and workstations of network 301 and their counterparts in network 301P. The time server may include, for example, a GPS satellite antenna wired to a grandmaster precision time protocol (PTP) clock. Thus, the PTP protocol may be used to synchronize clocks throughout networks 301 and 301P. The PTP may be in accordance to the standards specified in IEEE 1588-2002 and IEEE 1588-2008.

The network TAPS shown in FIG. 3 may be designed to mirror the traffic without impeding the flow of the production traffic flowing in network 301. Referring now to FIG. 3A, a detailed illustration of a network TAP 600 in accordance with the present disclosure is shown. Each network TAP may also comprise a processor 602 and memory 608. The first network interface 604 may be coupled to wired or wireless networks. In one example, the first network interface 604 may comprise a plurality of ports configured to permit bi-directional traffic to pass through network TAP 600. The second network interface 606 may provide access to a device in second network 301P. That is, the duplicate packets may be forwarded via the second network interface 606. However, in other examples, first network interface 604 may permit the bi-directional traffic as well as forward the duplicate packets to network 301P. Memory 608 of network TAP 600 may include network access instructions.

Each network TAP may be a switched port analyzer (SPAN) or remote switch port analyzer (RSPAN) TAP that makes copies of each packet passing between devices in the network. In one example, each network TAP shown in FIG. 3 may be an optical fiber TAP. An optical fiber TAP may provide the exact duplicate of the signal on the network link without any disruption to the network activity. Optical fiber TAPS may continually pass data on its ports, without either modifying or degrading the signal passing through. The Optical fiber TAP may provide a duplicate of each packet passing by splitting a small amount of light flowing on the tapped network link. In on example, the network TAPS shown in the figures may be active Optical fiber TAPS, which use electricity for operation, or passive Optical fiber TAPS that do not use electricity.

Referring back to the example of FIG. 3, packets received by corresponding devices in network 301P (i.e., workstations 302P/314P and switches 306P/310P), may be forwarded to hub 316. Hub 316 may be a series of packet handling switches that route all the packets to computer apparatus 100. Hub 316 may insert other relevant information in the packet. By way of example, if network 301 is used for real-time trading of financial instruments, Hub 316 may ensure that all the relevant identifiers are included in the packet (e.g., order identifier, trade identifier, etc.).

All the packets received by computer apparatus 100 from Hub 316 may be stored in database 108 and the packets may be sorted by timestamp. That is, computer apparatus 100 may store all the packets transferred between the devices of network 301 in database 108 by way of network 301P. As noted above, the users of network 301 may be traders and the packets may represent orders for financial instruments or execution of trades for financial instruments. In this instance, a second packet may be associated with the first packet by way of an order identifier, execution identifier, etc. That is, the second packet may have an identifier that is identical to or related in some way with the first packet (e.g., each packet may be a different transaction on the same order). Referring now to FIG. 3B, an example packet representing a trade for a financial instrument is shown. The illustrative packet of FIG. 3B may comprise transport protocol details 402, a source internet protocol ("IP") address 404, and a user identifier field 406. The illustrative packet may also comprise a financial instrument field 408 that may contain a symbol of a stock or bond, and a price field 410 that may represent a bid price, ask price, or execution price. The illustrative packet may also contain a size field 412 that may represent an amount of the instrument being bought, sold, or otherwise executed, and a timestamp field 414 that may represent the time in which a particular network node generated or forwarded the packet. The illustrative packet may also include a destination IP address field 416. The precision of timestamp field 414 may be set to nanoseconds, however it is understood that different levels of precision may be used. As noted above, in one example, the timestamps between networks 301 and 301P are synchronized.

Referring back to FIG. 2, computer apparatus 100 may launch packets in the second network from a respective node in the second network that corresponds to the source IP address in each packet, as shown in block 208. In one example, the monitoring network 301P shown in FIG. 3 may be used to replay the packets. However, a separate replay network may also be used. FIG. 3C illustrates a working example of a separate replay network. The network in FIG. 3C may be used for replay and analysis instead of the networks shown in FIG. 3 to further avoid any risk of disrupting the production environment of network 301. A separate replay network may also be advantageous if disruption to the monitoring network 301P is also necessary. In this instance, network 301R shown in FIG. 3C may be used for replay in lieu of network 301P. However, it is understood that network 301P may still be used for replay and analysis. Network 301R of FIG. 3C may have workstations 302R and 314R and switches 306R and 310R. The workstations and switches shown in network 301R may also have identical IP addresses as their respective corresponding devices in network 301. That is, the IP addresses of workstations 302R and 314R may be identical to the IP addresses of workstations 302 and 314 in network 301 of FIG. 3 respectively. Similarly, the IP addresses of switches 306R and 310R may have the identical IP addresses as switches 306 and 310 in network 301 respectively. While FIG. 3C shows computer apparatus 100 also used for replay, it is understood that a different computer apparatus may be used for replay. Each packet in database 108 may include a source IP address, an identifier, and a timestamp. In addition, the plurality of packets may be sorted in the database by timestamp and identifier. Also, in other implementations, the IP addresses of the replay devices in network 301R may be different from their counterparts in the production network. In this instance, the source and destination IP addresses of each packet may need to be altered before replay. This change of IP addresses may not disturb the production and mirror networks shown in FIG. 3.

As noted above, each packet in database 108 may comprise a source IP address, an identifier, and a timestamp. Referring back to the working example of FIG. 3, a packet travelling from workstation 302 to workstation 314 in network 301, may have a total of three copies stored in database 108. By way of example, a first copy may be generated by network TAP 304, a second copy may be generated by network TAP 308, and a third copy may be generated by network TAP 312. Thus, a snapshot of the packet as it travels through the network may be captured in database 108. By way of further example, the first, second, and third copies may be associated with a particular order of a financial trade.

Referring back to FIG. 3C, computer apparatus 100 may launch the plurality of packets from the corresponding source IP address in the second network (e.g., network 301R of FIG. 3B) in a sequence that is in accordance with the timestamp of each packet. This allows computer apparatus 100 to reproduce an initial route of each packet as it should have been in the first network (e.g., network 301). As noted above, at least one device in the network 301 has a corresponding device in network 301R.

As also noted above, three copies of a packet traveling from workstation 302 to workstation 314 in FIG. 3 may be stored in database 108. Network TAPS 304, 308, and 312 may generate each copy respectively. The first copy of the packet may have an earlier timestamp as the second packet, and the second packet may have an earlier timestamp than the third packet. The three packets may be sorted such that the packet with the earliest timestamp may be launched first, the packet with the second earliest timestamp may be launched second, and so on. In a trading system scenario, the packets may also be sorted by order identifier such that the packets of each order are grouped together in the database.

Referring back to FIG. 3C, computer apparatus 100 may retrieve the packets for a particular order, such as a first-in-first-out order based on the timestamp. In the event an administrator desires to launch a packet from workstation 302, computer apparatus 100 may transmit the first copy to workstation 302R to permit workstation 302R to launch the packet to workstation 314R again. This allows the system to replay a packet from different points in the network to determine where the packet was lost or where the packet encountered network congestion. In the event an administrator would like to play the second packet produced by network TAP 308 as the packet travelled from switch 306 to switch 310, computer apparatus 100 may retrieve and transmit the second packet to switch 306R and allow the packet to travel from switch 306R to workstation 314. Since these packets already include a destination IP address, the packets would automatically route to the destination node.

Figure 4:
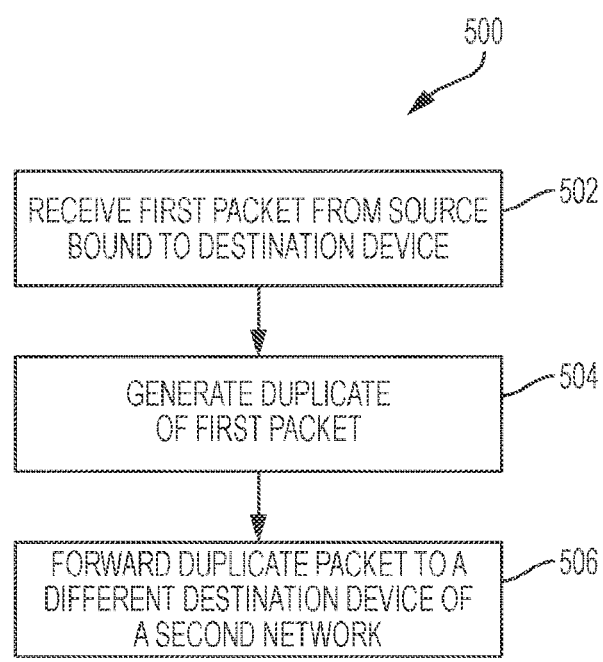
FIG. 4 is a further flow diagram of another example method in accordance with aspects of the disclosure.

Referring now to FIG. 4, an example method 500 that may be executed by a network TAP in network 301 is shown. In block 502, a network TAP may receive, via a network interface, a first packet from a source device, the first packet being bound for a destination device. As noted above, the source device and the destination device may be nodes of a first network, such as switch 306 and switch 310 of network 301. The source device and the destination device may each be associated with a respective IP address. In block 504, a network TAP may generate a duplicate packet that is a copy of the first packet. The network TAP may further permit packets to proceed toward the destination device in the first network. For example, in FIG. 3, network TAP 308 may permit a packet to flow between switch 306 and switch 310. In block 506, a network TAP may forward, using another network interface, the duplicate packet to another destination device having an IP address identical to that of the destination device in the first network. The other destination device may be a node in a second network different from the first network. For example, network TAP 308 in FIG. 3 may forward duplicate packets to either switch 306P or 310P depending on the direction in which the packet is traveling. As noted above, the switches and workstations in network 301P of FIG. 3 may have identical IP addresses as their counterparts in network 301 to reduce the burden on the production network.

Advantageously, the above-described system, non-transitory computer readable medium, and method permit monitoring of packets at different points in a network by using alternate networks with devices having the same IP address as some of the devices in the original network. This allows the TAPS of the live network to make exact copies of the packets without altering the destination IP address of each packet. Furthermore, this allows the packets to be analyzed and replayed without disrupting the production environment.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added. Furthermore, while some examples noted above refer to using the techniques herein in financial trading environments, it is understood that the techniques disclosed herein may be used in any type of production network environment, such as movie streaming, music streaming, or the like.

The invention claimed is:

1. A network tap apparatus comprising:
   a plurality of network interfaces;

at least one processor to:
receive, via a network interface, a packet from a source device, the packet being bound for a destination device, the source device and the destination device being nodes of a first network, the source device and the destination device each being associated with a respective internet protocol (IP) address;
sending, via the network interface, the packet to the destination device in the first network along a particular path in the first network;
generate a duplicate packet that is a copy of the packet; and
forward, using another network interface, the duplicate packet to another destination device in a second network, the another destination device in the second network having an IP address that is identical to that of the destination device in the first network, along a path in the second network that mirrors the particular path in the first network.

2. The network tap apparatus of claim 1, wherein the network tap apparatus is an optical fiber network tap.

3. The network tap apparatus of claim 1, wherein an internal clock of the destination device in the first network is synchronized with an internal clock of the destination device in the second network.

4. The network tap apparatus of claim 3, wherein the destination device of the first network and the destination device of the second network communicate with a time server in order to synchronize the respective internal clocks.

5. The network tap apparatus of claim 4, wherein the time server comprises a global positioning satellite antenna and a grandmaster precision time protocol clock.

6. The network tap apparatus of claim 1, wherein the at least one processor is configured to receive a timestamp value from a time server.

7. The network tap apparatus of claim 6, wherein the packet and the duplicate packet have the timestamp value form the time server.

8. The network tap apparatus of claim 1, wherein the network tap apparatus comprises a switched port analyzer (SPAN).

9. The network tap apparatus of claim 1, wherein the network tap apparatus comprises a remote switched port analyzer (RSPAN).

10. The network tap apparatus of claim 2, wherein generating the duplicate packet comprises splitting light flowing on a network link.

11. The network tap apparatus of claim 1, wherein the at least one processor is configured to cause a representation of the packet to be stored in a database.

12. The network tap apparatus of claim 11, wherein the duplicate packet is transmitted to the another destination device in the second network based on the representation stored in the database.

13. The network tap apparatus of claim 1, wherein the duplicate packet is an exact duplicate such that a signal representing the duplicate packet communicated to the second network via the another network interface is identical to a signal representing the packet received via the first network.

14. The network tap apparatus of claim 1, wherein a signal representing the duplicate packet communicated to the second network via the another network interface is different than the signal representing the packet received via the first network.

15. A network tap apparatus comprising:
at least one processor configured to:
receive, via a first network interface, a packet from a source device, the packet being bound for a destination device, the source device and the destination device being nodes of a first network, the source device and the destination device each being associated with a respective internet protocol (IP) address;
sending, via the first network interface, the packet to the destination device in the first network;
generate a duplicate packet that is a copy of the packet; and
forward, using a second network interface, the duplicate packet to another destination device in a second network,
wherein the at least one processor is configured to receive the packet and forward the duplicated packet, when the network tap apparatus is directly connected to a first node of the first network having a first IP address and a second node in the first network having a second IP address by the first network interface, and directly connected to a first node of the second network having an identical address to the first IP address, and a second node of the second network having an identical address to the second IP address by the second network interface.

* * * * *